United States Patent
Thomas

(10) Patent No.: US 9,494,445 B2
(45) Date of Patent: Nov. 15, 2016

(54) METHODS AND SYSTEMS FOR DETERMINING OPTIMUM FUEL STATION

(71) Applicant: WEX, Inc., South Portland, ME (US)

(72) Inventor: John Lind Thomas, South Freeport, ME (US)

(73) Assignee: WEX Inc., Portland, ME (US)

( * ) Notice: Subject to any disclaimer, the term of this patent is extended or adjusted under 35 U.S.C. 154(b) by 0 days.

(21) Appl. No.: 14/496,348

(22) Filed: Sep. 25, 2014

(65) Prior Publication Data

US 2015/0088409 A1    Mar. 26, 2015

Related U.S. Application Data

(60) Provisional application No. 61/883,020, filed on Sep. 26, 2013.

(51) Int. Cl.
  *G01C 21/00* (2006.01)
  *G01C 21/36* (2006.01)
  *G01C 21/34* (2006.01)

(52) U.S. Cl.
  CPC ....... *G01C 21/3697* (2013.01); *G01C 21/3469* (2013.01); *G01C 21/3682* (2013.01)

(58) Field of Classification Search
  CPC .......... G01C 21/3697; G01C 21/3469; G01C 21/3682
  USPC .................................................. 700/400, 401
  See application file for complete search history.

(56) References Cited

U.S. PATENT DOCUMENTS

| 6,434,479 | B1 * | 8/2002 | Kondou | G01S 5/0027 340/988 |
| 6,687,613 | B2 * | 2/2004 | Yokota | G01C 21/36 701/410 |
| 6,993,429 | B2 * | 1/2006 | Obradovich | G01C 21/3461 701/425 |
| 7,920,965 | B1 * | 4/2011 | Nesbitt | G01C 21/00 340/988 |
| 8,019,694 | B2 | 9/2011 | Fell et al. | |
| 8,095,303 | B1 * | 1/2012 | Nesbitt | G01C 21/3476 340/988 |

(Continued)

*Primary Examiner* — Ian Jen
(74) *Attorney, Agent, or Firm* — Pierce Atwood LLP; Kevin M. Farrell; Reza Sadr

(57) ABSTRACT

A system and method for planning fueling during a travel. The method comprises receiving information identifying a starting point and a destination for the travel; determining a route between the starting point and the destination; identifying one or more candidate fuel stations that are accessible from the route; determining scores for the one or more candidate fuel stations; and outputting information identifying the one or more candidate fuel stations along with their scores. Identifying one or more candidate fuel stations may include determining a search corridor; and identifying the one or more candidate fuel stations within the search corridor. Determining the search corridor may comprise selecting a search point located on the route; selecting a search radius; drawing a search circle with a radius equal to the search radius and centered at the search point; and including the search circle in the search corridor.

1 Claim, 9 Drawing Sheets

(56) References Cited

U.S. PATENT DOCUMENTS

| | | | |
|---|---|---|---|
| 8,862,576 B2* | 10/2014 | van Os | 707/722 |
| 8,924,148 B2* | 12/2014 | Nesbitt | G01C 21/00 340/990 |
| 2006/0095390 A1* | 5/2006 | Leberknight | G06Q 10/04 705/400 |
| 2007/0150171 A1* | 6/2007 | Tengler | G01C 21/36 701/123 |
| 2008/0167812 A1* | 7/2008 | Geelen | G01C 21/3641 701/469 |
| 2008/0243663 A1 | 10/2008 | Eveland | |
| 2009/0292458 A1* | 11/2009 | Nakamura | G01C 21/32 701/532 |
| 2010/0049397 A1* | 2/2010 | Liu | G08G 1/096833 701/31.4 |
| 2010/0198508 A1* | 8/2010 | Tang | G01C 21/3469 701/414 |
| 2010/0325049 A1* | 12/2010 | Tanaka | G06Q 10/06 705/44 |
| 2011/0060521 A1* | 3/2011 | Watkins | G01C 21/3469 701/469 |
| 2011/0288765 A1* | 11/2011 | Conway | G01C 21/3469 701/533 |
| 2012/0116673 A1* | 5/2012 | Lee | G01C 21/3415 701/432 |
| 2013/0046449 A1* | 2/2013 | Yucel | F16H 61/0213 701/51 |

* cited by examiner

METHODS AND SYSTEMS FOR DETERMINING OPTIMUM FUEL STATION

RELATED APPLICATION(S)

This application claims the benefit of provisional application No. 61/883,020, titled "Lowest Cost Fueling Station Calculation", filed on Sep. 26, 2013, the entire contents of which are incorporated herein by reference.

TECHNICAL FIELD

This disclosure relates generally to the field of optimizing fueling options and specifically for planning fueling of vehicles at a plurality of fuel stations.

BACKGROUND

Fueling costs are an important financial factor in use of personal or commercial vehicles for transportation. Optimizing these costs is important both for individuals and companies. Such optimization, however, may not be an easy task. The unit cost of fuel, for example, may differ at the fuel stations of different brands, and even at different fuel stations of the same brand. Moreover, factors other than the fuel cost may also matter in choosing a fuel station. These factors may include, for example, the location of the station and its proximity to the route of the vehicle, its brand, or other facilities that it provides. Existing technology, however, has not addressed the question of how to choose a fuel station to optimize the fuel cost or other convenience factors.

SUMMARY

In some embodiments, a method is executed by one or more processors for planning fueling during a travel. The method comprises receiving information identifying a starting point and a destination for the travel; determining a route between the starting point and the destination; identifying, using the one or more processors, one or more candidate fuel stations that are accessible from the route; determining, using the one or more processors, scores for the one or more candidate fuel stations; and outputting information identifying the one or more candidate fuel stations along with their scores. In some embodiments, the method further comprises: ranking the one or more candidate fuel stations based on the scores; and outputting the ranked list of the one or more candidate fuel stations.

In some embodiments, identifying one or more candidate fuel stations comprises: determining a search corridor, wherein the search corridor encompasses at least a portion of the route; and identifying the one or more candidate fuel stations within the search corridor. In some embodiments, determining the search corridor comprises: selecting a search point located on the route; selecting a search radius; drawing a search circle with a radius equal to the search radius and centered at the search point; and including the search circle in the search corridor. In some embodiments, identifying one or more candidate fuel stations comprises: finding a fuel station that is located within the search corridor; confirming that the fuel station satisfies one or more criteria; and including the fuel station among the one or more candidate fuel stations.

In some embodiments, determining the route between the starting point and the destination comprises determining a polyline between the starting point and the destination. In some embodiments, determining scores for the one or more candidate fuel station includes determining one or more of a fuel cost score, a travel cost score, and a resource cost score for one candidate fuel station of the one or more candidate fuel stations. In some embodiments, determining scores for the one or more candidate fuel station comprises determining a score for the one candidate fuel station by adding at least two of the fuel cost score, the travel cost score, and the resource cost score.

In some embodiments, determining the fuel cost score comprises determining a cost of fueling a vehicle at the one candidate fuel station. In some embodiments, determining the cost of fueling comprises: determining a unit cost of fuel at the fuel station; determining an amount of fuel required for the vehicle; and determining the cost of fueling based on the unit cost and the amount of fuel. In some embodiments, determining the travel cost score comprises determining a fuel cost of a detour to reach the one candidate fuel station. In some embodiments, determining the fuel cost of the detour comprises: determining an extra distance travelled due the detour; determining an extra amount of fuel resulting from the extra distance; determining a unit cost of fuel at the fuel station; and determining the fuel cost of the detour based on the unit cost and the extra amount of fuel.

In some embodiments, determining the resource cost score comprises determining an additional cost that results from an extra time spent on taking a detour to reach the one candidate fuel station. In some embodiments, determining the additional cost comprises: determining an extra time spent due the detour; determining a resource cost rate during the detour; and determining the additional cost based on the extra time and the resource cost rate. In some embodiments, the resource cost rate includes one or more of wage rate for one or more employees taking the detour or revenue rate from the one or more employees.

In some embodiments, a system for planning fueling during a travel comprises a client device configured to receive information that identify a starting point and a destination for the travel; a server that includes one or more processors and is configured to receive from the client device the information that identify the starting point and the destination; determine a route between the starting point and the destination; identify one or more candidate fuel stations that are accessible from the route; determine scores for the one or more candidate fuel stations; and transmit to the client device information that identify the one or more candidate fuel stations along with their scores. In some embodiments, the server is further configured to determine a search corridor, wherein the search corridor encompasses at least a portion of the route; and identify the one or more candidate fuel stations within the search corridor.

In some embodiments, a non-transitory computer-readable medium stores computer code that, when executed by one or more processors causes the one or more processors to perform a method executed for planning fueling during a travel, the method comprising receiving information identifying a starting point and a destination for the travel; determining a route between the starting point and the destination; identifying one or more candidate fuel stations that are accessible from the route; determining scores for the one or more candidate fuel stations; and outputting information identifying the one or more candidate fuel stations along with their scores.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings.

DETAILED DESCRIPTION

Figure 1:
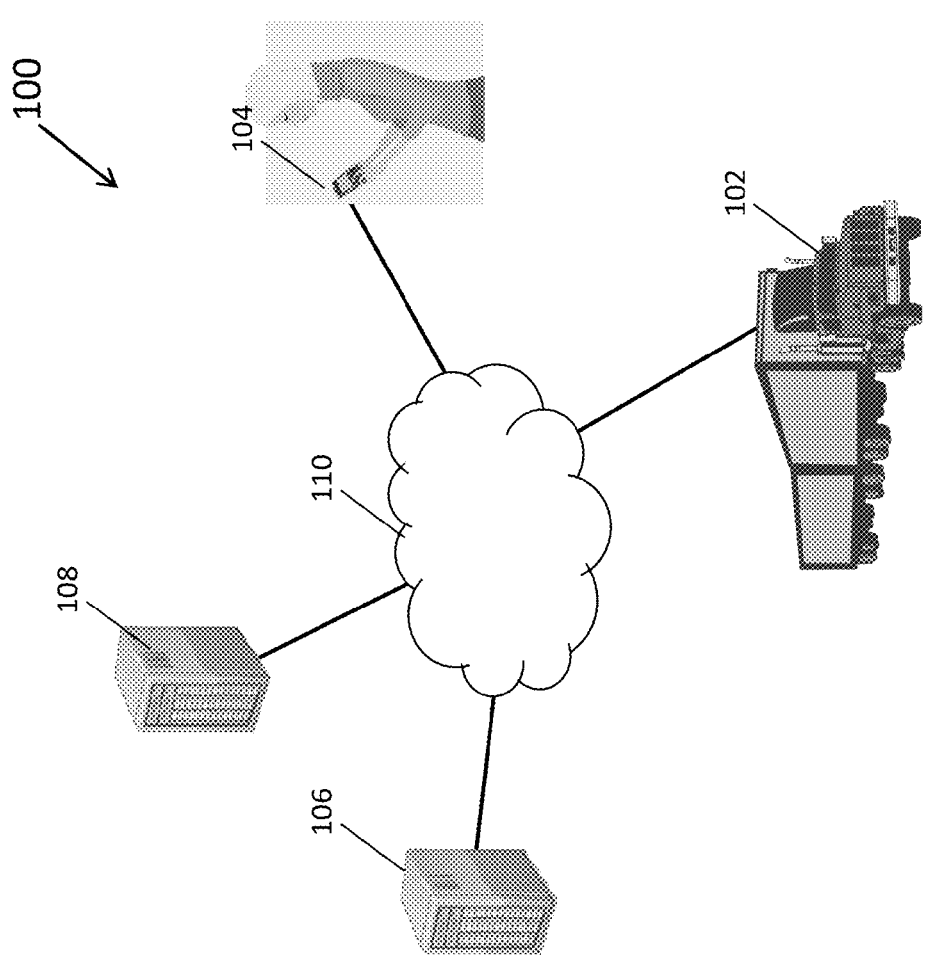
FIG. 1 illustrates a system for determining optimum fuel stations according to some embodiments.

The following detailed description refers to the accompanying drawings. The same or similar reference numbers may be used in the drawings or in the description to refer to the same or similar parts. Also, similarly-named elements may perform similar functions and may be similarly designed, unless specified otherwise. Details are set forth to provide an understanding of the described embodiments. The embodiments may be practiced without some of these details. In other instances, well-known techniques, procedures, and components have not been described in detail to avoid obscuring the described embodiments.

In some embodiments, fuel costs may be based on a number of cost components, and may be ranked accordingly. In some embodiments, the disclosed systems and methods combine routing capabilities, station location information, and user profile information to determine an overall cost of leaving a route to fill up at possible stations. This allows the user to understand if it is cost effective to go out of their way to pay a lower price per gallon, but pay more in travel costs and resource costs, or if they should choose a station that might be on the route, but cost more, for example.

Some embodiments relate to systems and methods that utilize a mobile device (mobile computer, tablet, smartphone embedded in-vehicle computer, and so on) and various capabilities provided on such platforms, such as location services, and mapping services and capabilities. Through a variety of user interface mechanisms, the user may indicate where they are (or system derived from platform location services) and where they are going. The system may make use of a data connection and external services to calculate the intended direct route. The system may then query external services for station information along a configurable corridor along the route.

In an embodiment, the system determines a configurable corridor along the route to search for stations. The system may first utilize a mapping systems API, which returns a route. The route may include several data elements, one of which is an "encoded polyline." The system decodes the polyline in order to identify a series of points that make up the "encoded polyline." A route from a starting point to a destination may include many points. For each point in the "encoded polyline," the system determines a set of parameters. In an example, one such parameter is a search radius around a subject point in the "encoded polyline." The radius may be a predefined radius that, in an example, can be modified by the user. The system may then retrieve all stations that are within the search radius of the subject point. The search radius for the subject point and a next point in the "encoded polyline" may generally overlap. Thus, combining the search radium for each point in the "encoded polyline" may create a search corridor along a route from a starting point to a destination point.

In some embodiments, the system identifies stations within the search radius by calling a data store that includes station information. For example, the data store can store information such as geolocation information and cost of gas. The system may match all stations that have a geolocation that is within a geolocation of a geographical region defined by the radius around each point in the "encoded polyline."

For each station it finds, the system may ensure that a desired fuel product is available and that the price of the fuel is known. The system may then compute the total cost of going to each station in the list. The total cost may be determined by including one or more factors such as the amount of fuel needed multiplied by the unit cost of fuel, the extra distance traveled off the direct route multiplied by the miles per gallon cost and other travel costs of the particular vehicle, or the extra time traveled as compared to traveling the direct route multiplied by the hourly cost of the resources in the vehicle. Each station considered may thus be given a total cost. The stations may then be sorted based on their costs, or provided to the user to decide at which station they want to get fuel.

The system may, with additional integration, retrieve the fuel tank level, tank size, and miles per gallon from the vehicle directly or indirectly. This may save the user from inputting such information themselves.

Some embodiments relate to systems and methods that calculate the total monetary cost of fueling location choices, thereby selecting, or allowing the user to select, one or more based on the cost, and understand cost of doing so if they choose one that is not the cheapest total cost.

Some embodiments may allow for users to sort or rank stations by time, rather than cost, in the event they just need fuel as quickly as possible. Some embodiments accomplish this result by setting the resource/opportunity costs to very high values. Doing so will ensure that the most important factor in choosing the lowest cost would be minimizing the travel time.

FIG. 1 illustrates a system 100 for determining optimum fuel stations according to some embodiments. System 100 includes a vehicle 102, a client device 104, a server 106, a fuel site locator device 108, and a network 110. Vehicle 102 may be a vehicle that is travelling on a route and for which the system should assess the cost and convenience of different fuel stations along the route. Vehicle 102 may be a passenger car, a truck, or other types of vehicles used for carrying passengers or cargo.

Client device 104 is a device that is configured to receive specific information about vehicle 102 or its route, to communicate that information with server 106, and to receive the system's output about available fuel stations or their level of convenience. In various embodiments, client device 104 may be a mobile device with a mobile application to perform its functions, a computer device installed on vehicle 102, and so on. In some embodiments, client device 104 is a device that is attached to or installed in vehicle 102. In some embodiments, client device 104 includes one or more input devices for receiving information from a user or from vehicle 102. The input devices may include a voice recognition input device, a touch sensitive interactive map, a text input device, a connection to a telematics device installed on vehicle 102, and so on.

Server 106 is a computer device that receives information about vehicle 102, its route, determines available fuels stations, or calculates scores for available fuel stations. The scores may be based on fuel price at the station, its proximity, availability of other conveniences, or other factors, as further discussed below. In various embodiments, server 106 may be computer installed in a main office, a distributed computer system located at different places, etc. Server 105 may include one or more processors, memory devices, storage device, and other parts used by computer devices.

Fuel site locator device 108 is configured to receive information about vehicle, its location, a route, or other criteria. In response, device 108 may return information about one or more fuel sites, such as gas stations, that match the received information based on some criteria detailed below. In various embodiments, device 108 may be computer installed in a main office, a distributed computer system located at different places, a third party system that provides this functionality as a service, etc.

Network 110 is a communication network used for communication by other parts in the system. Network 110 may include a computer network, a wired communication network, a wireless communicate network, etc. System 100 and its parts are further explained in more detailed in the rest of this disclosure.

Figure 2:
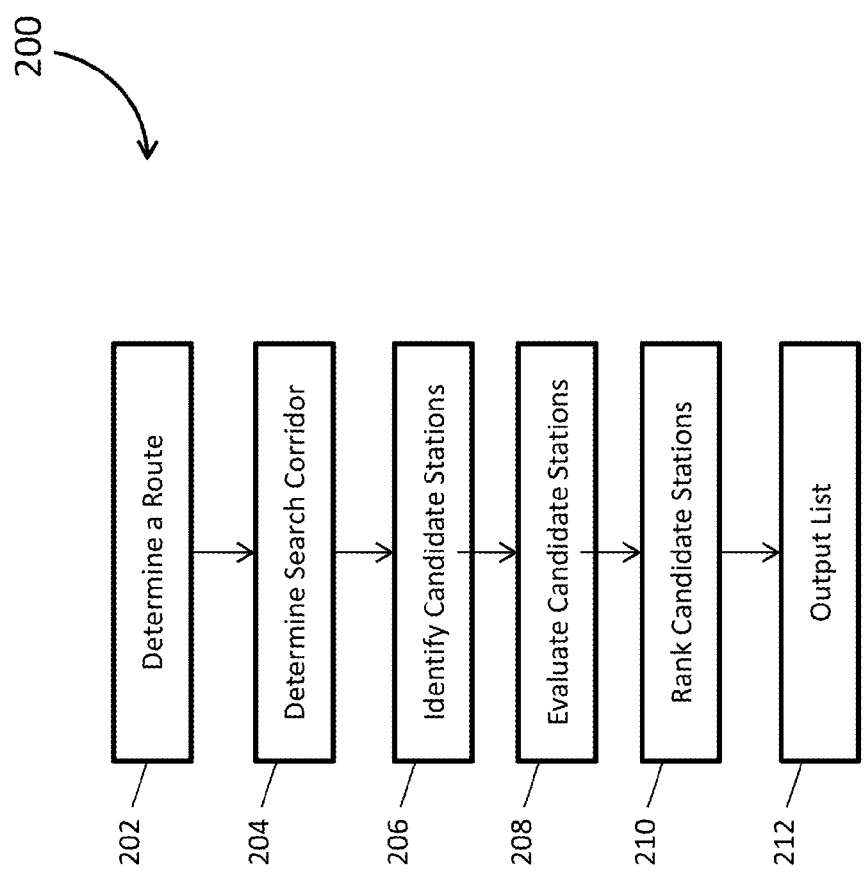
FIG. 2 shows a flow chart for a method of determining optimum fuel stations according to some embodiments.

Various embodiments perform one or more methods for determining optimum fuel stations. FIG. 2 shows a flow chart for such a method 200 according to some embodiments.

In step 202, a route of the vehicle is determined. The route may be determined based on, for example, the present location of the vehicle and its destination. The present location may be a starting point for the travel. In some embodiments, a user enters its present location via an input device. The input device may be a voice activated receiver, an interactive touch sensitive map, or a text input field. In some embodiments, the system detects the present location automatically using a locator mechanism such as an automatic vehicle location system, a dead reckoning system using motion sensors, and so on.

In step 204, the system determines a search corridor. In various embodiments, the search corridor is an area that encompasses a part or all of the vehicle's route.

In step 206, the system identifies one or more candidate stations. The candidate stations may be fuel stations that are inside the search corridor. Some embodiments do not use a search corridor and instead identify one or more candidate stations based on other criteria. A candidate station may be identified as, for example, a station that is accessible from some point on the route, located off of an exit along the route, frequently visited by vehicles that travel along the route, found by a service locator when one travels along the route, and so on. The candidate stations also may have to satisfy some other conditions, as further detailed below.

In step 208, the system evaluates the candidate stations. In particular, the system may assign a score to each station based on the cost of using that station. The system may also consider other factors, as detailed below.

In step 210, the system ranks the candidate stations based on one or more criteria. The criteria may include the score assigned to each station.

In step 212, the system outputs the list of available stations. The system may include in the list, the score for each station, or other information related to the station. The other information may include the fuel cost, the distance, or other facilities available in the station. The system may output this information to a user for the user to select from the list of candidate stations. Different techniques used in method 200 are further detailed below.

Figure 3A:
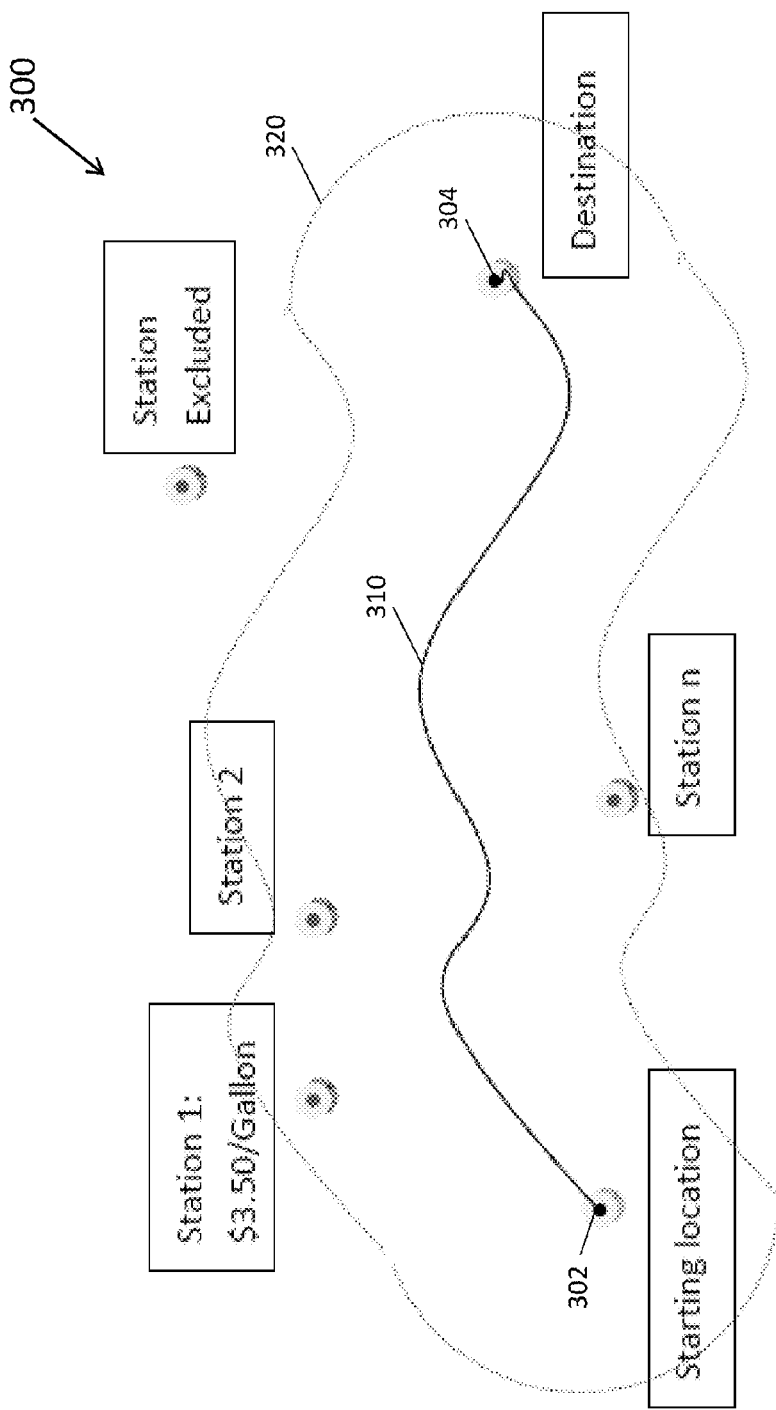
FIGS. 3A and 3B depict some details of determining a route and candidate stations according to some embodiments.
Figure 3B:
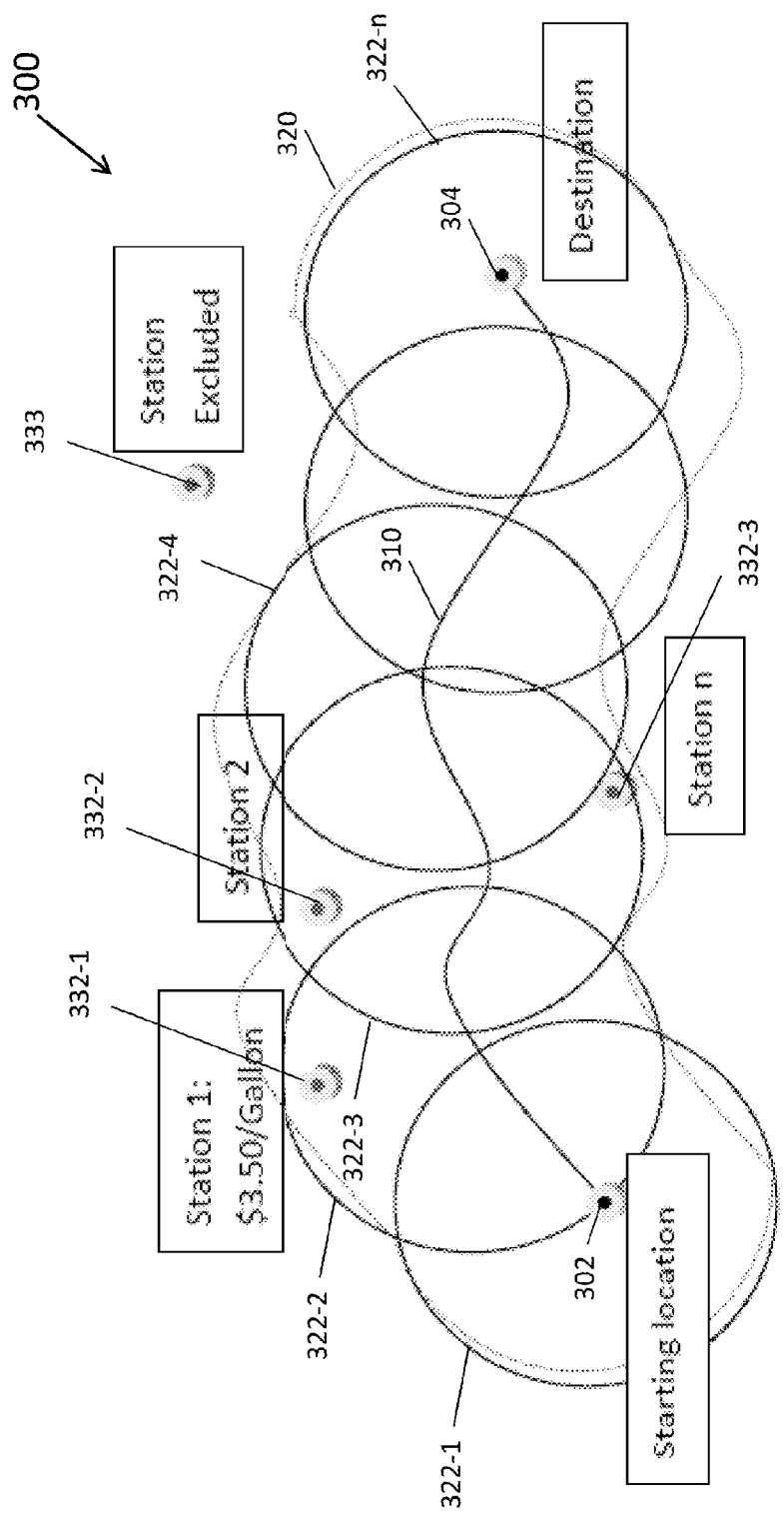

FIGS. 3A and 3B depict some details of determining the route and candidate stations according to some embodiments. In particular, FIGS. 3A and 3B depict a map 300. Map 300 includes a route 310, connecting a starting location 302 to a destination 304, and a corresponding corridor 320 that encompasses route 310. Route 310 may be calculated by a mapping system (such as Google maps, MapQuest, etc) and relayed to the system for display as a polyline. A polyline may include a starting latitude and longitude, and then a series of latitude and longitude deltas from the previous point, each delta representing the next incremental segment of the route. In some embodiments, the sizes of segments are smaller or equal to a resolution needed for maximum zoom limit. A maximum zoom limit may indicate, for example, a zoom limit that can show some commonly used details of a map, such as amenities, rest stops, gas stations, and so on. A union of the segments may represent route 310 for travelling between starting location 302 and destination 304.

Using the segments, the system may further derive corridor 320 as shown in FIG. 3B. In particular corridor 320 may be derived as a union of the areas of a series of overlapping search circles 322. Each search circle is centered around a search point located on route 310. The process of choosing the search points is further detailed below. For every search point, a search circle 322 is drawn with a radius equal to a search radius.

In some embodiments, the search radius is defaulted to a preset value. The preset value for the search radius may be set by a user. This preset value may be selected based on trial and error, prior uses, a common limit for the distance within which vehicles search for a fuel station, and so on. In one embodiment, for example, the preset value is set to five miles.

In some embodiments, the search radius is further adjusted based on one or more factors such as the trip length, density of stations, average distance of stations from main roads in a region, user preferences, and so on. In some embodiments, for example, the search radius is set to a factor of, e.g., twice, the average distance between fuel stations, or between fuel stations and the main road.

The first search point is starting location 302. Around this center, a first search circle 322-1 is drawn with a radius equal to the search radius. Similarly, the second search circle 322-2 is drawn with a center at the second search point and with a radius equal to the search radius. The last search circle 322-n is drawn with a center at the last search point and with a radius equal to the search radius. The last search point may be destination 304.

The search points may be chosen through the following inductive process. The initial search point may be chosen as starting location 302. Once each search point is determined, the next search point is determined by moving incrementally over the polyline and finding the first point with a distance from the previous search point that is more than a search delta, or otherwise is destination 304. In particular, after each search point is found, the polyline is traversed one or more times by a preset traversal distance along the polyline. Each traversal finds a next traversed point. If the direct distance between the traversed point and the previous search point is less than a search delta, the polyline is again traversed by the traversal distance to find the next traversed point on the polyline. These repeated traversals may reach a traversed point that is farther than the search delta from the previous search point. If so, this point is chosen as the next search point. Alternatively, the repeated traversals may not reach such a point and instead reach destination 304. In this case, destination 304 is chosen as the next (and last) search point.

In some embodiments, the values of the traversal distance and the search delta are preset. The search delta may be set to a factor times the search radius. In some embodiments, the factors is set to a number between 1 and 2, such as 1.2. The traversal distance is set to a fraction of the search delta. In some embodiments, the fraction is set to a value between 0.1 and 0.5.

Some embodiments identify candidate stations that fall within a search corridor. The system may identify these candidate stations using one or more search conditions. In particular, for each search point, the system transmits to a fuel site locator some search conditions. The search conditions may include location conditions. The location conditions may include the location of the search point and the search radius. The fuel site locator uses the location condition to find fuel sites (stations) that fall within the search circle centered at the search point. The conditions may further include one or more search criteria such as a brand of the station or the type of required fuel. The criteria may also include availability of one or more convenience such as rest room facilities, coffee, soda, food, etc. In return, the system may receive from the fuel site locator information about zero or more stations that satisfy the conditions. That is, stations that satisfy the location condition and further meet the criteria.

These found stations are included in a set as candidate stations. FIGS. 3A and 3B further show examples of the candidate stations for map 300 according to an embodiment. In this case, a fuel site locator considers stations 332-1, 332-2, 332-3, and 333. Of these stations, stations 332-1 to 332-3 are found to satisfy the location condition. In particular, station 332-1 is inside search circle 322-2, and stations 332-2 and 332-3 is inside search circle 322-3. Station 333, on the other hand, is not located in corridor 320, that is, inside a search circle 322, and therefore is excluded from the set of candidate stations.

The candidate stations are stations that a vehicle on route 310 may use for fueling. To choose one or more of these stations for fueling the vehicle, the system further evaluates and compares the candidate stations. In some embodiments the system evaluates each candidate station by assigning one or more scores to the station. The scores may relate to one or more types of costs. These types include a fuel cost, a travel cost, and a resource cost.

Figure 4:
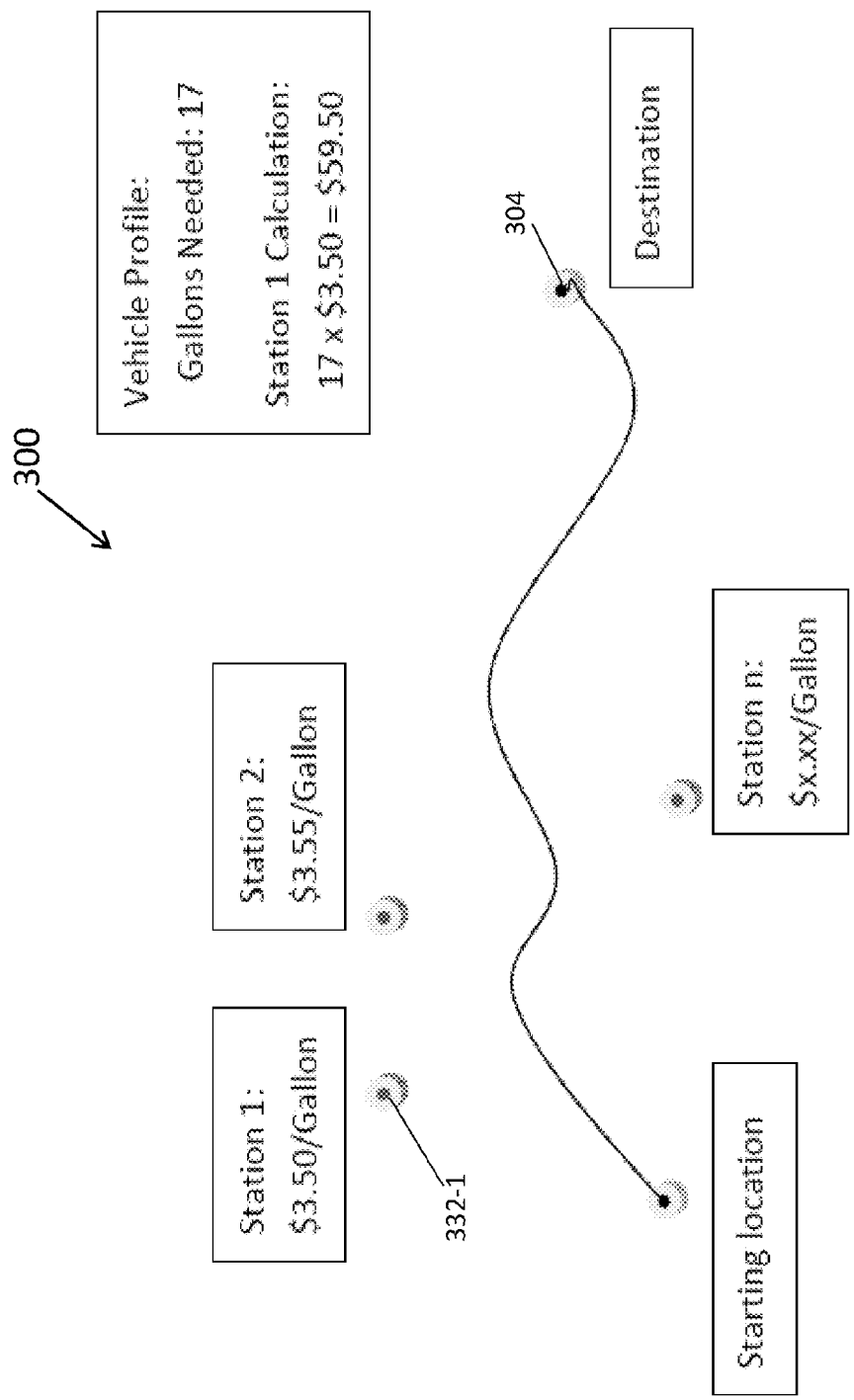
FIG. 4 illustrates calculating a fuel cost score according to an embodiment.

FIG. 4 illustrates calculating the score related to the fuel cost according to an embodiment. In particular, FIG. 4 illustrates calculating a fuel cost score for station 332-1 in map 300. The system may calculate this score by calculating the total cost of fuel if the vehicle uses the station. In some embodiment, to calculate the fuel cost score for this station, the system receives a unit cost of the required fuel at that station. The cost of fuel at the station may be returned by the external fuel site locater service as part of its search results.

Moreover, the system receives an amount of fuel to be used by the vehicle. This amount may be the total fuel capacity of the vehicle, the amount of fuel that is needed to top off the vehicle when the vehicle reaches the station, or the amount of fuel that the vehicle requires to reach destination 204. This amount of fuel may depend on one or more factors, such as the make and year of the vehicle, the present amount of fuel in its fuel tank, its average usage, the distance to the destination, etc. The amount of fuel needed may be calculated in a unit of volume, such as gallons.

In various embodiments, the system determines the amount of fuel needed through one or more different methods. In some embodiments, the system receives this amount directly through an input interface. The input interface may be a computer or electronic interface that a user can utilize. In some embodiments, the system sets the amount of fuel by default to the fuel tank capacity. Moreover, the system may receive the fuel tank capacity via an input interface or may determine it based on the make and year of the vehicle. In some embodiments, the system may receive the amount of needed fuel from a user or from a telematics system. A telematics system may reside in the vehicle and find the number of gallons needed, either directly or in combination with a configured tank size.

Once the system determines the values of the unit cost and the amount of fuel needed, the system may calculate the fuel cost score by multiplying these two values. In the embodiment shown in FIG. 4, the amount of fuel needed is 17 gallons, and the price of fuel at station 332-1 is 3.50 dollars per gallon. The system thus calculates the fuel cost score to be 59.50 dollars.

The score related to the travel cost relates to the additional cost that results from taking a detour to fuel at a candidate station. In some embodiment, to calculate the travel cost score for a station, the system determines the cost of the extra fuel consumed due to the detour.

Figure 5:
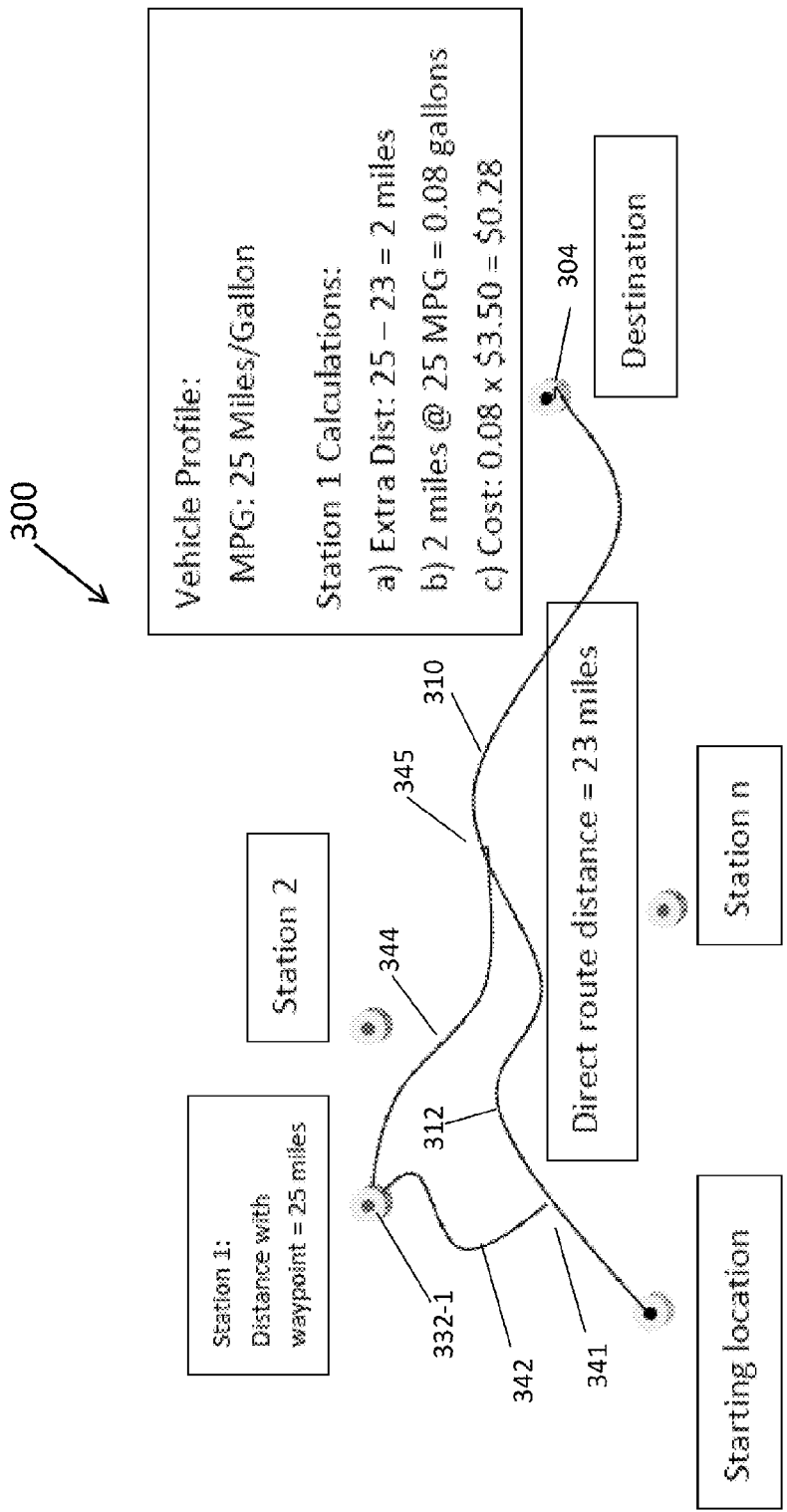
FIG. 5 illustrates calculating a travel cost score according to an embodiment.

FIG. 5 illustrates calculating the travel cost score for candidate station 332-1 in map 300 according to an embodiment. To that end, the system may find the change in travelled distance due to the detour. The system determines that to reach station 332-1, the vehicle has to leave the direct route 310 at point 341, and take side route 342. Further, to get back to its route toward destination 304, the vehicle has to take side route 344 and join back route 310 at point 345. Therefore, the detour causes the vehicle to take the side routes 342 and 344, instead of the portion 312 of the direct route 310. In the example of FIG. 5, the difference between the distance travelled on the side routes 342 and 344 versus the main route portion 312 is 2 miles.

To find the travel cost score, the system may find the extra fuel cost due to the extra distance resulting from the detour. In particular, in the example of FIG. 5, the system divides the extra distance by the fuel consumption of the vehicle (e.g., in Miles Per Gallon) to find the extra amount of fuel needed. The system them multiplies this extra amount by the unit price of the fuel at the candidate station to find the travel cost score.

The cost of fuel at the station may be returned by the external fuel site locater service as part of its search results. The MPG may be entered in the settings of the application or via integrations with telematics systems. In example of FIG. 5, the extra distance due to the detour is 2 miles, the fuel consumption of the vehicle is 25 MPG, and unit price of the fuel at station 332-1 is 3.50 dollars per gallon. The overall travel cost is thus calculated to be 0.28 dollars.

In some embodiments, the travel cost score may further relate to costs other than the fuel cost. The travel cost may, for example, include additional car maintenance or depreciation due to the extra distance. In some embodiments, the system may add such depreciation rate per unit distance to the fuel cost per unit distance. The system may use this combined cost rate as a single factor, and multiply this factor by the extra distance to derive the travel cost.

The score for the resource cost relates to the additional cost that results from the extra time that the vehicle spends to take the detour. The extra time for the detour may result in an extra pay to the employees that are riding the vehicle. The extra time for the detour may also result in an opportunity loss. The loss may relate to that, if the detour is not taken, the employees may finish the present task earlier and use the extra time to perform parts or all of another task. The value of the opportunity loss may thus relate to the revenue that the employer derives from those employees per unit time.

The resource cost score may further consider other types of losses that result from the extra time. In some embodiment, for example, this cost include the extra rent paid for rented equipments or vehicles that may used for the travel. These types of cost may be considered alone. Alternatively, they may be considered together by having these costs added to derive a resource cost rate such as, e.g., the total resource cost per hour. The resource cost score may then be calculated by multiplying the total resource cost per hour by the extra time added to the travel time due to the detour.

Figure 6:
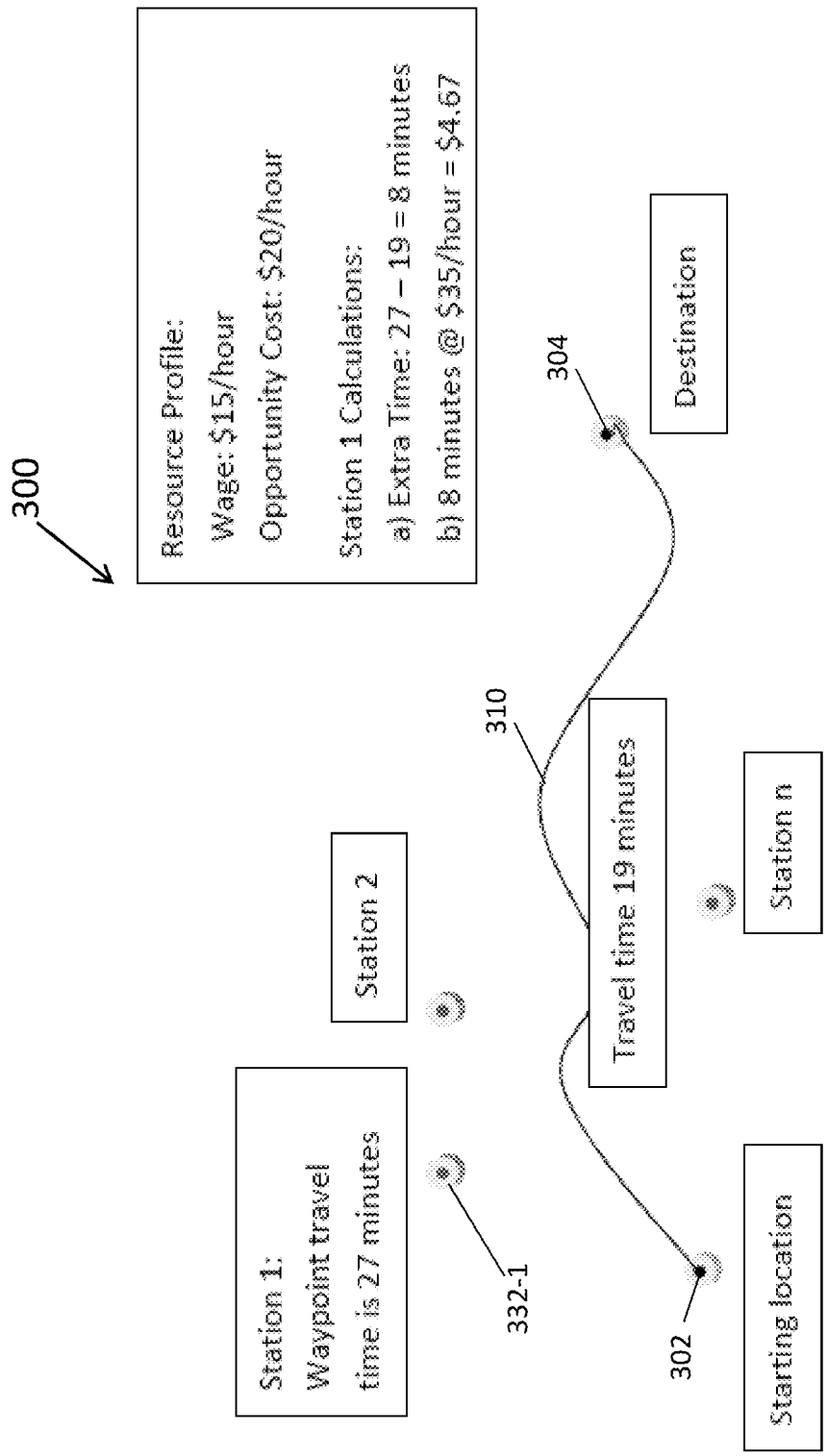
FIG. 6 illustrates calculating a resource cost score according to an embodiment.

FIG. 6 illustrates calculating the resource cost score for candidate station 332-1 in map 300 according to an embodiment. To that end, the system determines the extra time the vehicle takes for detouring to station 332-1. This extra time may be based on the extra distance of the detour, a change in speed limit on the detour, or possible other factors such as stop lights or slow traffic.

In the example of FIG. 6, the extra time is eight minutes, the hourly wage of the employees riding the vehicle is a total of 15 dollars per hour, and the opportunity cost is 20 dollars per hour. The total resource cost per hour is thus the sum of these, that is, 35 dollars per hour. Multiplying this rate by the extra time (8 minutes) results in a resource cost of $4.67.

Figure 7:
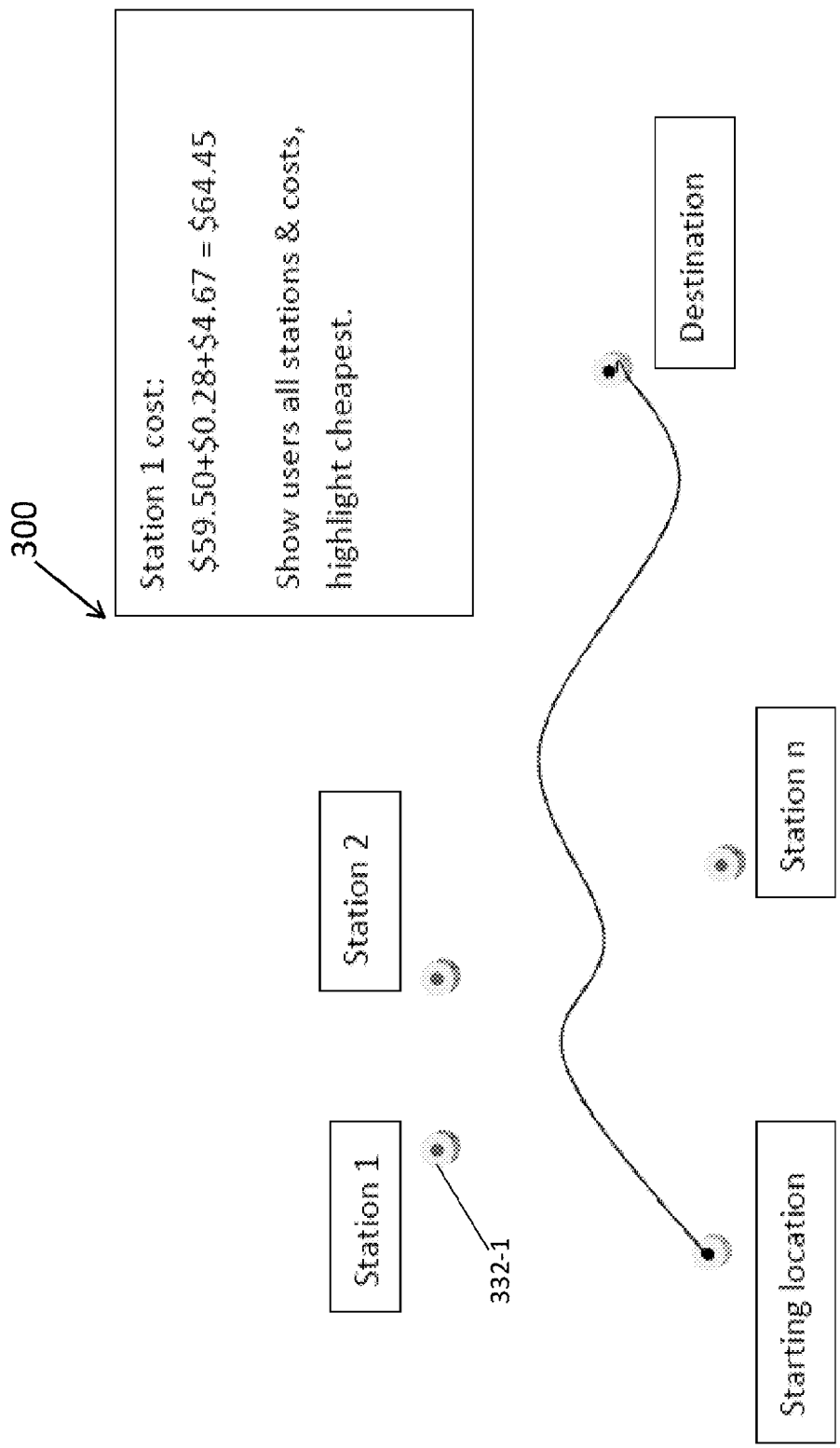
FIG. 7 illustrates calculation of the total cost score according to an embodiment.

The total score for each candidate station may be found by adding one or more costs that result from using that station. FIG. 7 illustrates calculation of the total cost score for candidate station 332-1 of map 300 according to an embodiment. In this case, the total cost score is the sum of the fuel cost score, the travel cost score, and the resource cost score. In the example of FIG. 7, this total cost adds to $64.45.

The system may calculate the total score for two or more candidate stations. The system may further present the results to a user for selecting one or more stations. Alternatively, the system may sort the candidate stations based on their scores and recommend them accordingly, e.g., in order of decreasing cost. The system may rank the stations in an increasing order of score, with the lowest score corresponding to the most convenient station.

Figure 8:
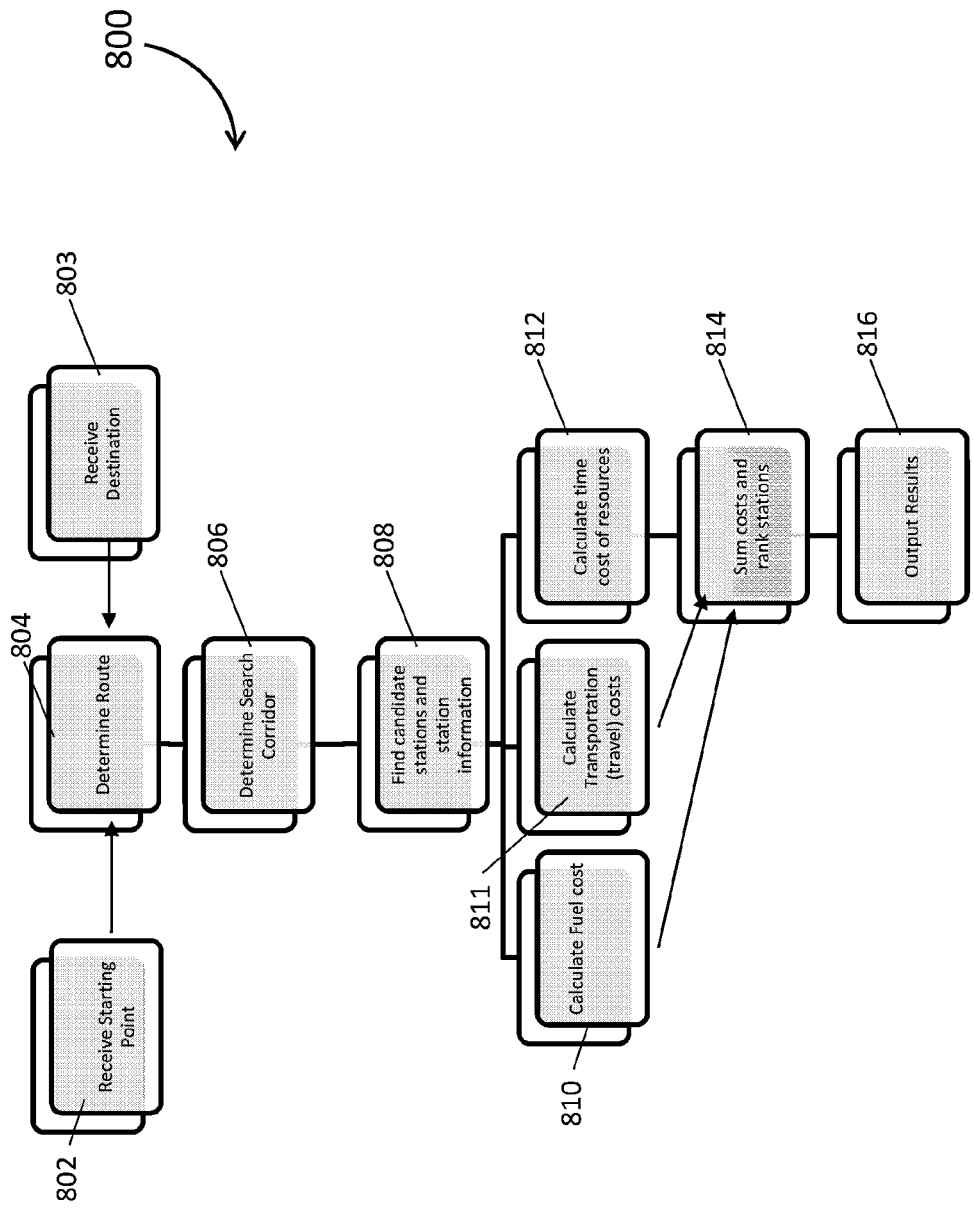
FIG. 8 shows another flowchart for a method of finding and ranking candidate stations according to some embodiments.

FIG. 8 shows another flowchart for a method 800 of finding and ranking candidate stations according to some embodiments.

In steps 802 and 803, the system receives a starting point and a destination. In step 804, the system determines a route between the starting point and the destination.

In step 806, the system determines a search corridor. The search corridor may encompass parts or all of the route.

In step 808, the system finds the candidate stations based on the corridor and other possible criteria. In steps 810-812, the system finds, respectively, the fuel cost score, the travel cost scores, and the resource cost score.

In step 814, the system calculates the total score for each station. The system may further rank the stations based on their scores.

In step 816, the system outputs the results. The results may include the list of one or more candidate stations along with information about each station, the cost score for each station, a sorted list of those stations, etc.

In some embodiments, the system outputs the results with visual indications on the map. Icons may be used to depict the lowest cost station, the next several runners up, as well as the stations with the shortest time, and stations with the cheapest gas of all those considered. As well, the system may speak the best station, giving the name and town in which it resides. Additional implementation options may include integration with native vehicle information systems to use the in-vehicle voice command integration, user input, or display.

In some embodiment, the stations are also separately ranked based on their detour time, with the least detour time being the first recommended one. In some embodiments, the same result may be derived by giving the travel time cost a higher weight compared to other costs. To that end, for example, the resource cost per hour may be set very high. Doing so will cause the resource cost score, itself related to the travel time, to be the determining factor in choosing the stations.

Each of the systems described above may comprise multiple modules or devices. The modules may be implemented individually or their functions may be combined with the functions of other modules. Further, each of the modules may be implemented on individual components, or the modules may be implemented as a combination of components. For example, each of the modules may be implemented by a field-programmable gate array (FPGA), an application-specific integrated circuit (ASIC), a complex programmable logic device (CPLD), a printed circuit board (PCB), a combination of program able logic components and programmable interconnects, single CPU chip, a CPU chip combined on a motherboard, a general purpose computer, or any other combination of devices or modules capable of performing the tasks of the corresponding module.

In some embodiments, one or more of the disclosed methods are stored in the form of programs on one or more non-transitory computer readable mediums. A computer readable medium can be a data storage module. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, the conjunction "or" is often used inclusively, and not exclusively, unless stated otherwise or deducted otherwise from the context.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

What is claimed is:

1. A method executed by one or more processors for planning fueling during a travel, the method comprising:
receiving information identifying a starting point and a destination for the travel;
determining a route between the starting point and the destination;
identifying, using the one or more processors, one or more candidate fuel stations that are accessible from the route;
determining, using the one or more processors, scores for the one or more candidate fuel stations; and
outputting information identifying the one or more candidate fuel stations along with their scores,
wherein determining scores for the one or more candidate fuel stations includes determining one or more of a fuel cost score, a travel cost score, and a resource cost score for one candidate fuel station of the one or more candidate fuel stations;
wherein determining the resource cost score comprises determining an additional cost that results from an extra time spent on taking a detour to reach the one candidate fuel station;
wherein determining the additional cost comprises determining an extra time spent due the detour, determining a resource cost rate during the detour, and determining the additional cost based on the extra time and the resource cost rate; and
wherein the resource cost rate includes one or more of wage rate for one or more employees taking the detour or revenue rate from the one or more employees.

* * * * *